(12) United States Patent
Choi et al.

(10) Patent No.: US 12,300,790 B2
(45) Date of Patent: May 13, 2025

(54) ALL-SOLID-STATE BATTERY WITH IMPROVED LIFETIME BY APPLYING EXPANSION LAYER AND OPERATING METHOD THEREOF

(71) Applicants: HYUNDAI MOTOR COMPANY, Seoul (KR); KIA MOTORS CORPORATION, Seoul (KR)

(72) Inventors: Yong Seok Choi, Seoul (KR); Young Jin Nam, Suwon-si (KR); Myoung Kyou Lee, Suwon-si (KR); Jae Min Lim, Suwon-si (KR); Soon Chul Byun, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 520 days.

(21) Appl. No.: 16/871,190

(22) Filed: May 11, 2020

(65) Prior Publication Data

US 2021/0159544 A1 May 27, 2021

(30) Foreign Application Priority Data

Nov. 26, 2019 (KR) .......................... 10-2019-0153189

(51) Int. Cl.
*H01M 10/058* (2010.01)
*C08F 214/18* (2006.01)
*C08F 214/22* (2006.01)
*H01M 10/04* (2006.01)
*H01M 10/0562* (2010.01)
*H01M 10/0585* (2010.01)

(52) U.S. Cl.
CPC ..... *H01M 10/0585* (2013.01); *C08F 214/182* (2013.01); *C08F 214/22* (2013.01); *H01M 10/0481* (2013.01)

(58) Field of Classification Search
CPC ...................... H01M 10/0481; H01M 10/0585
See application file for complete search history.

(56) References Cited

U.S. PATENT DOCUMENTS

2010/0255371 A1* 10/2010 Takayama ............... H01M 4/13
156/182
2017/0373300 A1* 12/2017 Maeda ............ H01M 10/0436
2019/0393557 A1* 12/2019 Itoh ................... H01M 10/0562

FOREIGN PATENT DOCUMENTS

| JP | 2004-103415 A | 4/2004 |
| JP | 2019-125455 A | 7/2019 |
| JP | 2019-140022 A | 8/2019 |
| KR | 2018-0072944 A | 7/2018 |

* cited by examiner

*Primary Examiner* — Osei K Amponsah
(74) *Attorney, Agent, or Firm* — MCDONNELL BOEHNEN HULBERT & BERGHOFF LLP

(57) ABSTRACT

The present disclosure relates to an all-solid-state battery with improved lifetime and an operating method thereof. Specifically, the all-solid-state battery includes a laminate including a unit cell provided with an anode, a cathode, and a solid electrolyte layer interposed between the anode and the cathode, and an expansion layer positioned on at least one surface of the laminate, and expanded by at least any one change in voltage and temperature.

12 Claims, 4 Drawing Sheets

ALL-SOLID-STATE BATTERY WITH IMPROVED LIFETIME BY APPLYING EXPANSION LAYER AND OPERATING METHOD THEREOF

CROSS REFERENCE TO RELATED APPLICATIONS

This application claims under 35 U.S.C. § 119(a) the benefit of priority to Korean Patent Application No. 10-2019-0153189 filed on Nov. 26, 2019, the entire contents of which are incorporated herein by reference.

BACKGROUND (a) Technical Field

The present disclosure relates to an all-solid-state battery with improved lifetime and an operating method thereof.

(b) Background Art

A lithium secondary battery that is chargeable and dischargeable is used not only in a small electronic device such as a mobile phone or a notebook, but also in a large transportation means such as a hybrid vehicle or an electric vehicle. Therefore, there is a need for the development of a secondary battery having higher stability and energy density.

Since a conventional lithium secondary battery mostly constitutes a cell based on organic solvent (organic liquid electrolyte), there shows the limitation in enhancing stability and energy density.

Meanwhile, an all-solid-state battery using inorganic solid electrolyte has recently received great attention because it may manufacture a cell in a safer and simpler form based on a technology excluding organic solvent.

However, the all-solid-state battery has a problem in that the respective components are broken by contraction and expansion as charging and discharging are performed, or the lifetime is shortened due to the weak adhesion between interfaces. One method to prevent the solid electrolyte from being broken by contraction and expansion is by adding a binder. However, this prevention effect has not been sufficient, and when manufacturing an all-solid-state battery by a wet process, the selection range of solvent is narrowed by the kind of binder used.

The above information disclosed in this Background section is only for enhancement of understanding of the background of the disclosure, and accordingly may contain information that does not form the prior art that is already known in this country to a person of ordinary skill in the art.

SUMMARY

An object of the present disclosure is to provide an all-solid-state battery and an operating method thereof, which do not shorten the lifetime even if charging and discharging are repeatedly performed.

The object of the present disclosure is not limited to the above-mentioned object. The object of the present disclosure will become more apparent from the following description, and will be realized by the means described in the claims and combinations thereof.

An all-solid-state battery according to an embodiment of the present disclosure may include a laminate including a unit cell provided with an anode, a cathode, and a solid electrolyte layer interposed between the anode and the cathode and an expansion layer positioned on at least one surface of the laminate, and expanded by at least any one change in voltage and temperature.

The expansion layer may contain a piezoelectric polymer selected from the group consisting of a Polyvinylidene fluoride-based polymer containing at least any one among Polyvinylidenefluoride, Poly(vinylidene fluoride-co-hexafluoropropylene), Poly(vinylidene fluoride-co-trifluoroethylene), and Poly(vinylidene fluoride-co-tetrafluoroethylene); a Fluorine-based polymer containing at least any one among Polytetrafluoroethylene (PTFE), Perfluoroalkoxy (PFA), and Fluoroethylenepropylene (FEP); a Styrene-ethylene-butadiene-styrene (SEBS) terpolymer with or without a functional group; a sulfonated poly(styrene-ethylene) (SPSE); and combinations thereof.

The expansion layer may contain a thermally expandable polymer selected from the group consisting of Polystyrene, Polymethylmethacrylate, Polyethylene, Polypropylene, Polymethylpentene, Polybutene, Polyurethane, Ethylene-propylene rubber, and combinations thereof.

The expansion layer may be positioned on both surfaces of the laminate, and the thickness of each expansion layer may be the same as or different from each other.

The laminate may have a plurality of unit cells stacked.

The laminate may be stacked in plural with the expansion layer interposed therebetween.

A thickness (a) and an expansion rate (b) of the expansion layer may satisfy Equation 1 below:

$$\frac{a}{m} \times b > n(0.02 \times c) \qquad \text{Equation 1}$$

where a refers to the thickness of the expansion layer, b refers to the expansion rate of the expansion layer, m refers to the number of the expansion layers included in the all-solid-state battery, c refers to the thickness of the unit cell, and n refers to the number of the unit cells included in the laminate, as an integer of 1 or more.

The thickness of the expansion layer may be 300 μm to 1,000 μm.

The expansion rate of the expansion layer may be 0.01 to 0.05.

The thickness of the anode may be 50 μm to 300 μm, the thickness of the cathode may be 50 μm to 300 μm, and the thickness of the solid electrolyte layer may be 10 μm to 500 μm.

The all-solid-state battery may further include an anode current collector on the anode, and the thickness of the anode current collector may be 5 μm to 15 μm.

The all-solid-state battery may further include a cathode current collector on the cathode, and the thickness of the cathode current collector may be 5 μm to 15 μm.

A method of operating an all-solid-state battery according to the present disclosure may include changing at least any one of pressure and temperature applied to the all-solid-state battery.

Since the all-solid-state battery according to the present disclosure may apply pressure to the unit cell from the outside of the unit cell, it is possible to effectively solve the problem of shortening the lifetime due to the contraction and expansion of the components.

The effects of the present disclosure are not limited to the effects mentioned above. It should be understood that the effects of the present disclosure include all the effects inferable from the description below.

It is understood that the term "vehicle" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
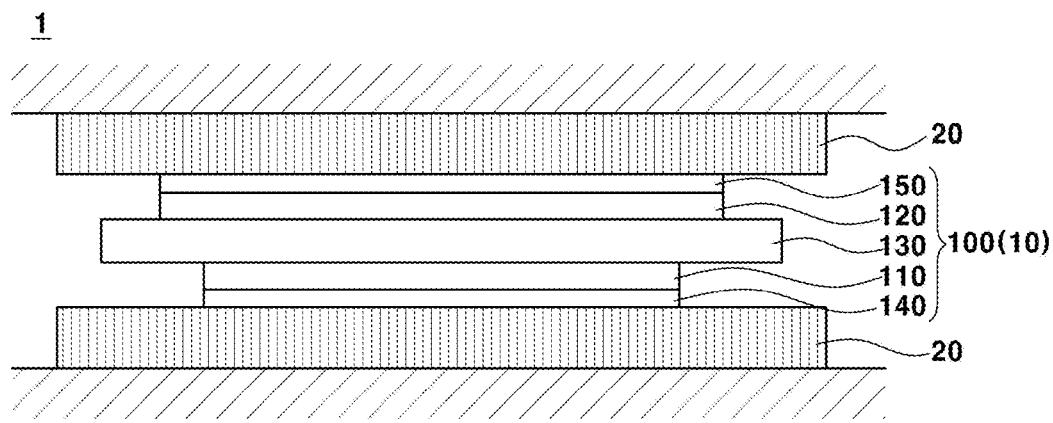
FIG. 1 is a diagram illustrating a first embodiment of an all-solid-state battery according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

As described above, objects, other objects, features, and advantages according to the present disclosure will be readily understood through the following preferred embodiments associated with the accompanying drawings. However, the present disclosure is not limited to the embodiments described herein and may also be embodied in other forms. Rather, the embodiments introduced herein are provided so that the disclosure may be made thorough and complete, and the spirit according to the present disclosure may be sufficiently conveyed to those skilled in the art.

In this specification, it should be understood that terms such as "comprise" or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof. Further, when a portion such as a layer, a film, a region, or a plate is referred to as being "above" the other portion, it may be not only "right above" or "directly above" the other portion, but there may be another portion in the middle. On the contrary, when a portion such as a layer, a film, a region, or a plate is referred to as being "under" the other portion, it may be not only "right under" or "directly under" the other portion, but there may be another portion in the middle.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. Further, where a numerical range is disclosed herein, such range is continuous, and includes unless otherwise indicated, every value from the minimum value to and including the maximum value of such range. Still further, where such a range refers to integers, unless otherwise indicated, every integer from the minimum value to and including the maximum value is included.

FIG. 1 schematically illustrates an all-solid-state battery according to the present disclosure. The all-solid-state battery 1 includes a laminate 10 including a unit cell 100 provided with an anode 110, a cathode 120, and a solid electrolyte layer 130 interposed between the anode 110 and the cathode 120, and an expansion layer 20 positioned on at least one surface of the laminate 10.

The present disclosure is characterized by applying the expansion layer 20 to the all-solid-state battery 1. In the all-solid-state battery 1, the lithium ions ($Li^+$) move to the cathode 120 to be stored as the lithium metal ($Li^0$) during the charging. On the contrary, during the discharging, the lithium metal ($Li^0$) is converted into the lithium ions ($Li^+$), and moves to the anode 110 to be stored in the form of lithium oxide ($Li_2O$) or the like. That is, as the all-solid-state battery 1 is charged and discharged, the volumes of the anode 110 and the cathode 120 are repeatedly expanded and contracted, respectively. In the process, solid-state components such as an active material and a solid electrolyte contained in the electrodes 110, 120 may be broken, or the contact between the electrodes 110, 120 and the solid electrolyte layer 130 is weakened.

The present disclosure may form the expansion layer 20 containing a material whose volume is expanded under a specific condition outside the laminate 10 to apply pressure to the laminate 10, thereby canceling the influence by the expansion and contraction of the volumes of the electrodes 110, 120. Hereinafter, the expansion layer 20 will be described in detail.

The expansion layer 20 contains a material that is expanded by at least any one change in voltage and temperature.

The expansion layer 20 may contain a piezoelectric polymer whose volume is expanded by a change in voltage. The piezoelectric polymer may contain one selected from the group consisting of a Polyvinylidene fluoride-based polymer, a Fluorine-based polymer, a Styrene-ethylene-butadiene-styrene (SEBS) terpolymer with or without a functional group, a sulfonated poly (styrene-ethylene) (SPSE), and combinations thereof.

The Polyvinylidene fluoride-based polymer may contain at least any one among Polyvinylidene fluoride, Poly(vinylidene fluoride-co-hexafluoropropylene), Poly(vinylidene fluoride-co-trifluoroethylene), and Poly(vinylidene fluoride-co-tetrafluoroethylene).

The fluorine-based polymer may contain at least any one among Polytetrafluoroethylene (PTFE), Perfluoroalkoxy (PFA), and Fluoroethylenepropylene (FEP).

Meanwhile, the expansion layer 20 may also contain a thermally expandable polymer whose volume is expanded by a change in temperature. The thermally expandable polymer may contain one selected from the group consisting of Polystyrene, Polymethylmethacrylate, Polyethylene, Polypropylene, Polymethylpentene, Polybutene, Polyurethane, Ethylene-propylene rubber, and combinations thereof.

As described above, the expansion layer 20 is for applying pressure to the laminate 10 from the outside of the laminate 10. Therefore, the expansion layer 20 may be applied in various embodiments if it may play such a role. Hereinafter, various embodiments of the laminate 10 and the expansion layer 20 will be described with reference to the drawings. However, since this is only illustrative, the shapes, positions, and the like of the laminate 10 and the expansion layer 20 should not be construed as being limited to each drawing.

Referring to FIG. 1, the expansion layer 20 may be positioned on both surfaces of the laminate 10. Here, the all-solid-state battery 1 including the laminate 10 and the expansion layer 20 may be provided in a certain space such as a pouch or a housing.

Figure 2:
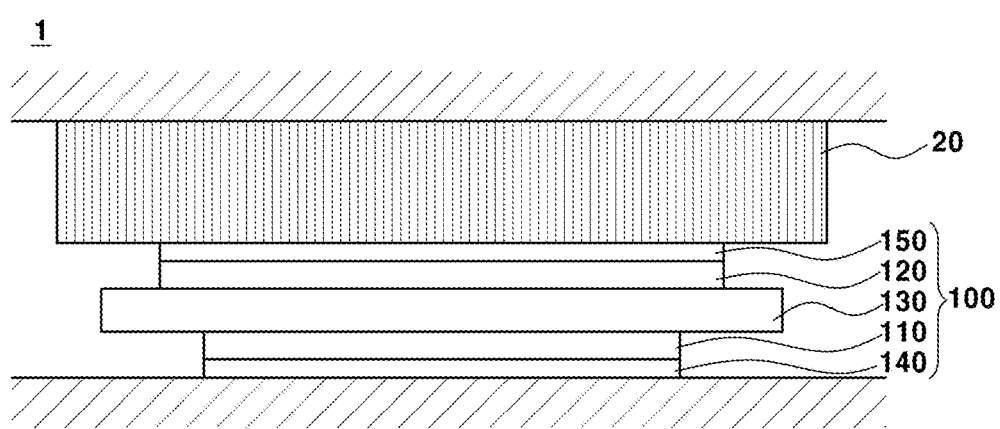
FIG. 2 is a diagram illustrating a second embodiment of the all-solid-state battery according to the present disclosure.

Referring to FIG. 2, the expansion layer 20 may be positioned on one surface of the laminate 10. FIG. 2 illustrates that the expansion layer 20 is positioned at the cathode 120 side, but may also be positioned at the anode 110 side.

Figure 3:
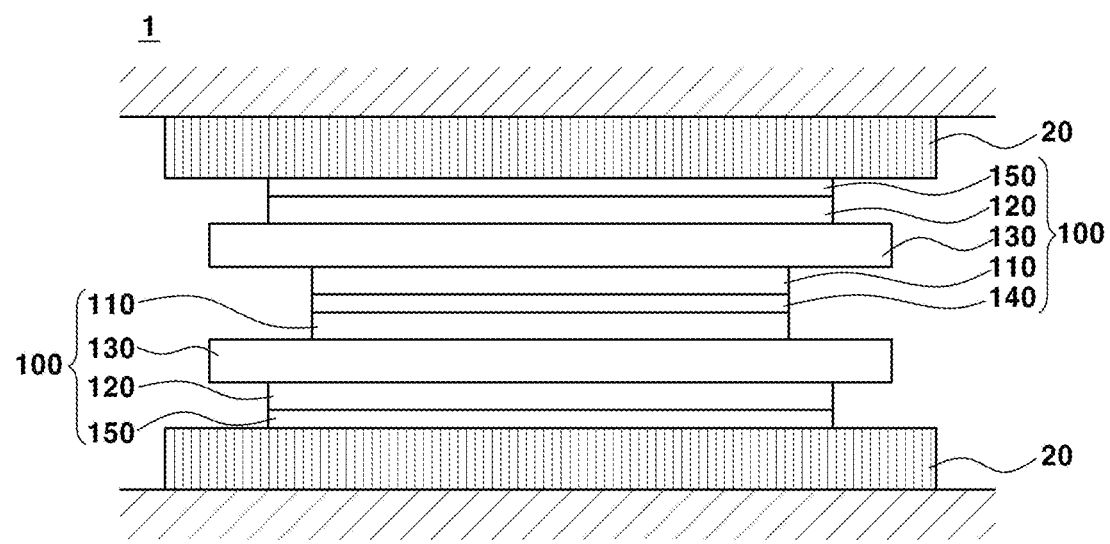
FIG. 3 is a diagram illustrating a third embodiment of the all-solid-state battery according to the present disclosure.

FIG. 3 illustrates the all-solid-state battery 1 including a plurality of unit cells 100 in the laminate 10. Referring to this, the all-solid-state battery 1 may be provided with the expansion layer 20 on both surfaces of the laminate 10 including the plurality of unit cells 100. However, as in FIG. 2, the expansion layer 20 may also be positioned on one surface of the laminate 10.

Figure 4:
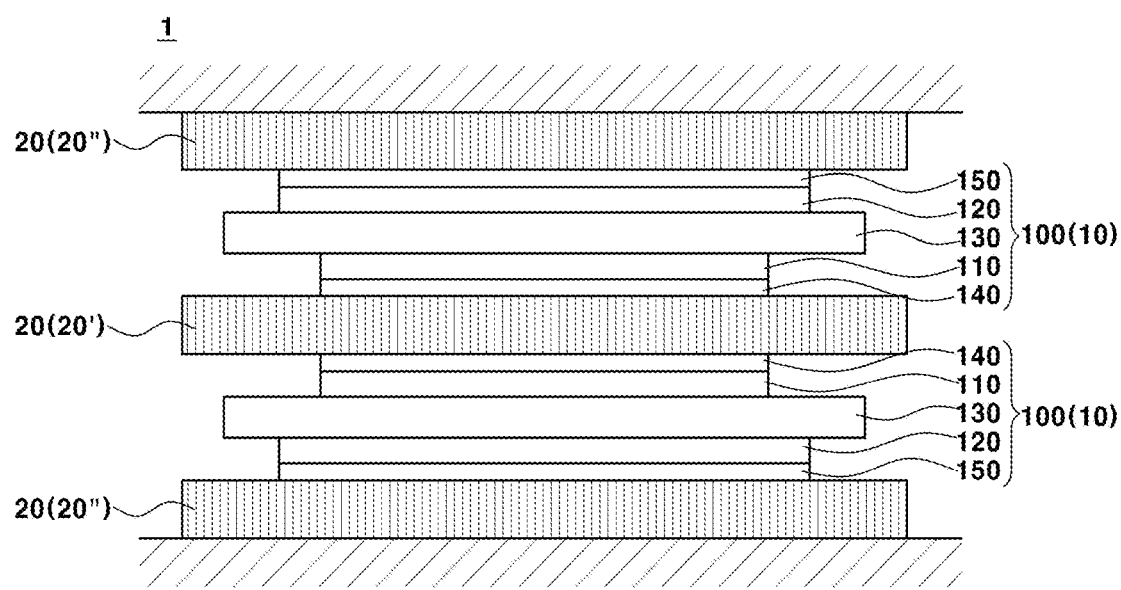
FIG. 4 is a diagram illustrating a fourth embodiment of the all-solid-state battery according to the present disclosure.

FIG. 4 illustrates the all-solid-state battery 1 in which the laminate 10 has been stacked in plural with the expansion layer 20 interposed therebetween. Referring to this, the expansion layer 20 may include a one 20' interposed between the plurality of laminates 10 and a one 20'' positioned at the outermost portion thereof. However, the expansion layer 20 may also include only the one 20' interposed between the plurality of laminates 10.

The present disclosure is not a simple introduction of the expansion layer 20, but is characterized by applying it considering both the thickness of the expansion layer 20 and the expansion rate of the expansion layer 20 according to the thickness of the unit cell 100. This will be described in detail below.

The expansion layer 20 is characterized in that the thickness (a) and the expansion rate (b) satisfy the following Equation 1:

$$\frac{a}{m} \times b > n(0.02 \times c) \quad \text{Equation 1}$$

where a refers to the thickness of the expansion layer 20, b refers to the expansion rate of the expansion layer 20, and m refers to the number of the expansion layers 20 included in the all-solid-state battery 1. Here, if the all-solid-state battery 1 is provided with a plurality of expansion layers 20, the thickness (a) of the expansion layer 20 is a value of summing the thicknesses of all the expansion layers 20. For reference, the thicknesses of the plurality of expansion layers 20 may be the same as or different from each other as described above. The expansion rate (b) may mean a volume expansion rate of the expansion layer 20, and may mean the maximum volume expansion rate when the expansion layer 20 is expanded by at least one change in voltage and temperature. The expansion rate (b) is a dimensionless number that means the ratio of the initial volume of the expansion layer 20 and the volume when the expansion layer 20 was expanded by at least one change in voltage and temperature.

Further, c refers to the thickness of the unit cell 100, and n refers to the number of the unit cells 100 included in the laminate 10, as an integer of 1 or more.

For example, in the case of the all-solid-state battery 1 as in FIG. 1, the thickness (a) of the expansion layer 20 is a value of summing the thicknesses of a pair of expansion layers 20 positioned on both surfaces of the laminate 10, and m is 2. Further, n is 1, and c refers to the thickness of the unit cell 100.

In the case of the all-solid-state battery 1 as in FIG. 2, the thickness (a) of the expansion layer 20 refers to the thickness of the expansion layer 20 positioned on one surface of the laminate 10, and m is 1. Further, n is 1, and c refers to the thickness of the unit cell 100.

In the case of the all-solid-state battery 1 as in FIG. 3, the thickness (a) of the expansion layer 20 is a value of summing the thicknesses of the pair of the expansion layers 20 positioned on both surfaces of the laminate 10, and m is 2. Meanwhile, n is 2, and the c refers to the thickness of each unit cell 100 included in the laminate 10. As in FIG. 3, as the unit cell 100 is provided in plural in the laminate 10, the degree of expansion and contraction of the volume is greater. Therefore, the external force by the expansion layer 20 should be strongly applied. This means that the thickness (a) and/or the expansion rate (b) of the expansion layer 20 should be large, and n may be its expression.

In the case of the all-solid-state battery 1 as in FIG. 4, the thickness (a) of the expansion layer 20 is a value of summing the thicknesses of the one 20' interposed between the laminates 10 and the one 20'' of the outermost portion thereof, and m is 3. Meanwhile, n is 1 and c refers to the thickness of the unit cell 100. For reference, as in FIG. 4, as the number of the unit cells 100 increases, the number of the expansion layers 20 increases together, such that it is not necessary to correct the equation as in FIG. 3.

The "2" in the Equation 1 is a kind of coefficient, and means the relationship that the thickness (a) and the expansion rate (b) of the expansion layer 20, and the thickness (c) of the unit cell should have in order to achieve the purpose of the present disclosure. This was obtained experimentally, which will be described in detail with reference to the embodiments.

As described above, only when the expansion layer 20 satisfying the Equation 1 is applied, it is possible to effectively cancel the adverse effects of the expansion and contraction of the volumes of the electrodes 110, 120 due to the charging and discharging of the all-solid-state battery 1.

The thickness and expansion rate of the expansion layer 20 are not particularly limited as long as it satisfies the Equation 1, but it is preferable that it is not the extent that the implementation is difficult or a function as a battery is lost because its range is beyond a general battery specification.

For example, the thickness of the expansion layer 20 may be 300 μm to 1,000 μm. Further, the expansion rate of the expansion layer 20 may be 0.01 to 0.05. Here, 0.05 of the expansion rate means that the volume of the expansion layer 20 has been expanded by 5% compared to the initial volume due to the change in voltage and/or temperature.

Further, the thickness (c) of the unit cell 100 is not particularly limited either as long as it satisfies the Equation 1, but it is preferable that it is not the extent that the implementation is difficult or a function as a battery is lost because its range is beyond a general battery specification.

For example, the thicknesses of the anode 110 and the cathode 120 may be 50 μm to 300 μm, respectively. The thickness of the solid electrolyte layer 130 may be 10 μm to 500 μm.

The unit cell 100 may further include an anode current collector 140 on the anode 110. The thickness of the anode current collector 140 is not particularly limited, but may be, for example, 5 μm to 15 μm.

Further, the unit cell 100 may further include a cathode current collector 150 on the cathode 120. The thickness of the cathode current collector 150 is not particularly limited, but may be, for example, 5 μm to 15 μm.

Each configuration of the unit cell 100 is not particularly limited in its component and function, and any one of those known in the art to which the present disclosure pertains may also be used as long as it satisfies the Equation 1 in the relationship with the expansion layer 20.

Hereinafter, the present disclosure will be described in more detail with reference to specific embodiments. The following embodiments are merely examples for helping understanding of the present disclosure, and the scope of the present disclosure is not limited thereto.

Experimental Example 1

As in FIG. 1, the all-solid-state battery 1 to which the expansion layer 20 was applied to both surfaces of the unit cell 100 was manufactured. At this time, Poly (vinylidene fluoride-co-trifluoroethylene), which is a piezoelectric polymer, was used as the expansion layer. Various types of all-solid-state batteries were manufactured by properly adjusting the specific specification of each configuration, and the details thereof are illustrated in the following Table 1. The expansion rate of the expansion layer was adjusted as follows by irradiating electrons to the copolymer to make defects in the crystal structure of the polymer.

TABLE 1

| Items | Thickness (a) of expansion layer [μm] | Expansion rate (b) of expansion layer | Thickness (c) of unit cell [μm] | Whether to satisfy Equation 1[1)] |
|---|---|---|---|---|
| Embodiment 1 | 500 | 0.05 | 347 | ○ |
| Embodiment 2 | 500 | 0.03 | 347 | ○ |
| Comparative Example 1 | 500 | 0.01 | 347 | X |
| Comparative Example 2 | Expansion layer not applied | | 347 | X |

1) $\frac{a}{m} \times b > n(0.02 \times c)$, in the Experimental Example 1, m is 2, and n is 1.

Figure 5:
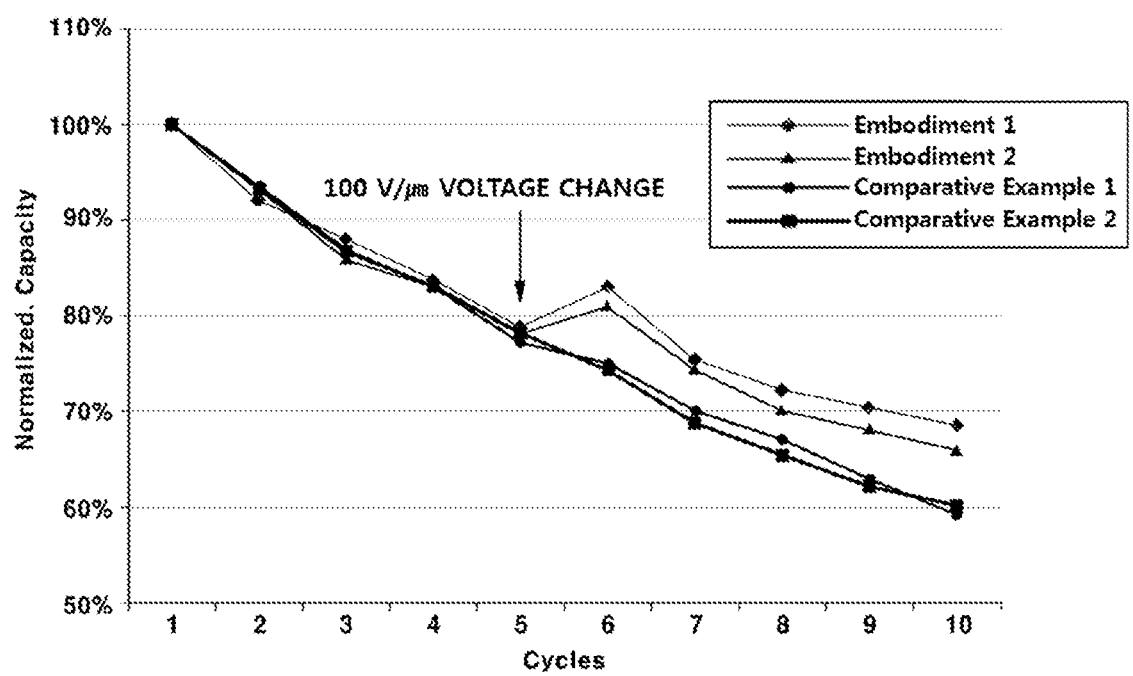
FIG. 5 is a graph illustrating the result of a first experimental example below.

Charging and discharging experiments were carried out for the all-solid-state batteries according to the Embodiments 1 and 2 and the Comparative Examples 1 and 2. After charging and discharging each all-solid-state battery five times, the applied voltage was changed to 100 V/μm to induce the volume expansion of the expansion layer. Thereafter, the capacity of each all-solid-state battery was measured while repeating the charging and discharging up to 10 times. The results areas in FIG. 5. Referring to this, it may be seen that in the Embodiments 1 and 2 that have applied the expansion layer to satisfy the Equation 1, the capacity was recovered after changing the voltage.

Experimental Example 2

Next, all-solid-state batteries as in the following Table 2 were prepared. Except for the items of the following Table 2, the all-solid-state batteries were prepared in the same manner as in the Experimental Example 1.

TABLE 2

| Items | Thickness (a) of expansion layer [μm] | Expansion rate (b) of expansion layer | Thickness (c) of unit cell [μm] | Whether to satisfy Equation 1[1)] |
|---|---|---|---|---|
| Embodiment 3 | 500 | 0.03 | 347 | ○ |
| Comparative Example 3 | 200 | 0.03 | 347 | X |
| Comparative Example 4 | 100 | 0.03 | 347 | X |
| Comparative Example 5 | Expansion layer not applied | | 347 | X |

1) $\frac{a}{m} \times b > n(0.02 \times c)$, in the Experimental Example 2, m is 2 and n is 1.

Figure 6:
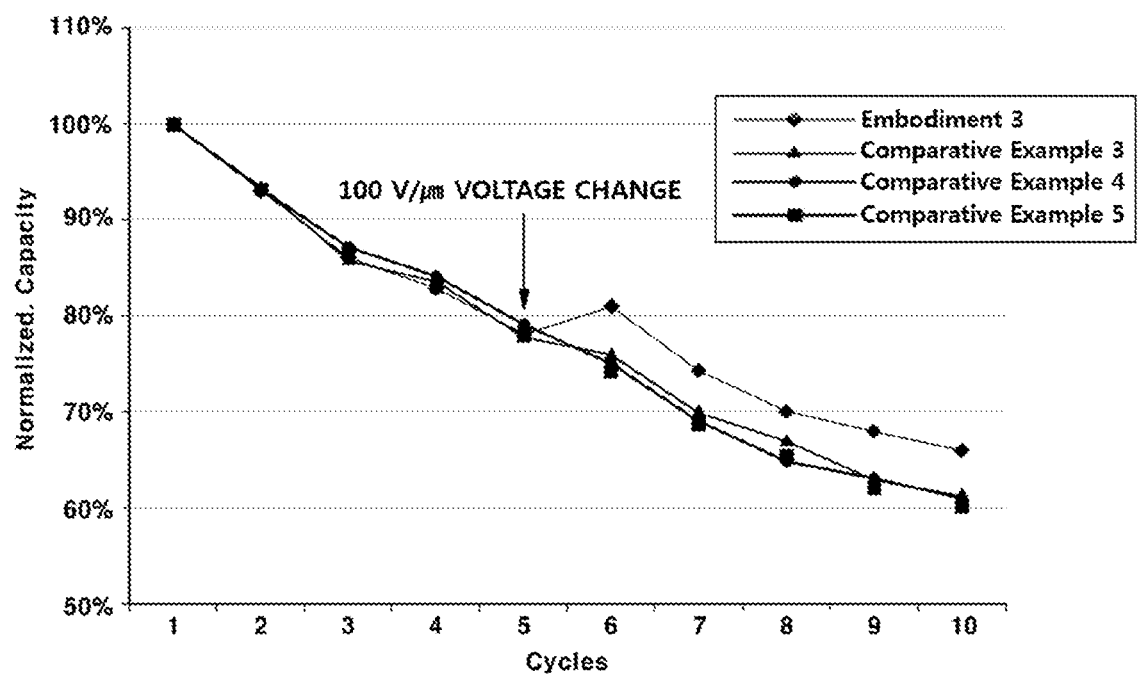
FIG. 6 is a graph illustrating the result of a second experimental example below.

Charging and discharging experiments were carried out for the all-solid-state batteries according to the Embodiment 3 and the Comparative Examples 3, 4, 5. After charging and discharging each all-solid-state battery five times, the applied voltage was changed to 100 V/μm to induce the volume expansion of the expansion layer. Thereafter, the capacity of each all-solid-state battery was measured while repeating the charging and discharging up to 10 times. The results areas in FIG. 6. Referring to this, it may be seen that only in the Embodiment 3 that has applied the expansion layer to satisfy the Equation 1, the capacity was recovered after changing the voltage.

As described above, in operating the all-solid-state battery according to the present disclosure, the capacity may be recovered again if the expansion layer is expanded by changing at least any one of pressure and temperature applied to the all-solid-state battery in a state where the all-solid-state battery has been charged and discharged a predetermined number of times.

That is, the all-solid-state battery according to the present disclosure has a high charging/discharging capacity and a capacity retention rate when the number of charging/discharging times is the same as that of the conventional battery. This means that the lifetime of the all-solid-state battery according to the present disclosure is longer.

As described above, although the embodiments of the present disclosure have been described with reference to the accompanying drawings, those skilled in the art to which the present disclosure pertains may understand that the present disclosure may be carried out in other specific forms without changing the technical spirit or essential features thereof. Therefore, it should be understood that the embodiments described above are exemplary in all respects and not restrictive.

The invention claimed is:

1. An all-solid-state battery, comprising:
a laminate comprising a unit cell provided with an anode, a cathode, and a solid electrolyte layer interposed between the anode and the cathode, the laminate having a top surface and a bottom surface, the unit cell further comprising at least one of an anode current collector positioned on an outer surface of the anode and a cathode current collector positioned on an outer surface of the cathode; and
an expansion layer positioned on at least one of the top surface and the bottom surface of the laminate in a horizontal direction, and expanded by at least any one change in voltage and temperature;
wherein the expansion layer is positioned on at least one of the anode current collector and the cathode current collector;
wherein a thickness (a) and an expansion rate (b) of the expansion layer satisfy the equation:

$$\frac{a}{m} \times b > n(0.02 \times c),$$

where a is the thickness of the expansion layer, b is the expansion rate of the expansion layer, and m is the number of the expansion layers comprised in the all-solid-state battery, c is the thickness of the unit cell, and n is the number of the unit cells comprised in the laminate, as an integer of 1 or more;
wherein the thickness of the expansion layer is 500 μm to 1,000 μm; and
wherein the expansion rate of the expansion layer is 0.01 to 0.05.

2. The all-solid-state battery of claim 1, wherein the expansion layer comprises a piezoelectric polymer selected from the group consisting of:
a Polyvinylidenefluoride-based polymer comprising at least one of Polyvinylidenefluoride, Poly (vinylidene fluoride-co-hexafluoropropylene), Poly (vinylidene fluoride-co-trifluoroethylene), and Poly (vinylidene fluoride-co-tetrafluoroethylene);
a Fluorine-based polymer comprising at least one of Polytetrafluoroethylene (PTFE), Perfluoroalkoxy (PFA), and Fluoroethylenepropylene (FEP);
a Styrene-ethylene-butadiene-styrene (SEBS) terpolymer with or without a functional group;
a sulfonated poly (styrene-ethylene) (SPSE); and
combinations thereof.

3. The all-solid-state battery of claim 1, wherein the expansion layer comprises a thermally expandable polymer selected from the group consisting of Polystyrene, Polymethylmethacrylate, Polyethylene, Polypropylene, Polymethylpentene, Polybutene, Polyurethane, Ethylene-propylene rubber, and combinations thereof.

4. The all-solid-state battery of claim 1, wherein the thickness of each expansion layer is the same as or different from each other.

5. The all-solid-state battery of claim 1, wherein the laminate has a plurality of unit cells stacked.

6. The all-solid-state battery of claim 1, wherein the laminate is stacked in plural with the expansion layer interposed therebetween.

7. The all-solid-state battery of claim 1, wherein the thickness of the anode is 50 μm to 300 μm.

8. The all-solid-state battery of claim 1, wherein the thickness of the cathode is 50 μm to 300 μm.

9. The all-solid-state battery of claim 1, wherein the thickness of the solid electrolyte layer is 10 μm to 500 μm.

10. The all-solid-state battery of claim 1, wherein the unit cell comprises the anode current collector, wherein the thickness of the anode current collector is 5 μm to 15 μm.

11. The all-solid-state battery of claim 1, wherein the unit cell comprises the cathode current collector, wherein the thickness of the cathode current collector is 5 μm to 15 μm.

12. An operating method of an all-solid-state battery, comprising:
operating the all-solid-state battery of claim 1, and changing at least one of pressure and temperature applied to the all-solid-state battery.

* * * * *